March 3, 1970 K. A. RUST 3,498,382
FIRE FIGHTING APPARATUS
Filed June 7, 1967
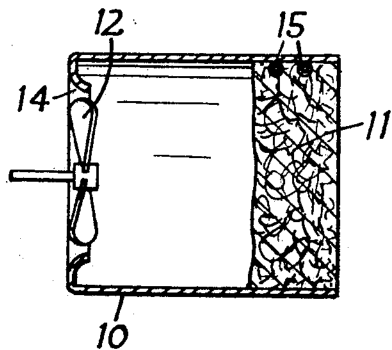
INVENTOR
KENNETH ALBERT RUST
BY
[signature]
AGENT United States Patent Office 3,498,382
Patented Mar. 3, 1970

1

3,498,382

FIRE FIGHTING APPARATUS

Kenneth A. Rust, London, England, assignor, by mesne assignments, to Walter Kidde & Company, Inc., Belleville, N.J., a corporation of New York Filed June 7, 1967, Ser. No. 644,127
Int. Cl. A62c *35/00*
U.S. Cl. 169—15 1 Claim

ABSTRACT OF THE DISCLOSURE

A high expansion foam generator comprises a fan and mesh at opposite ends of a wind tunnel. Within the mesh there are a pair of pipes for supplying a foam generating liquid mixture throughout the mesh.

This invention relates to apparatus for generating foam for fire fighting purposes.

This invention is concerned with such apparatus for generating a high expansion foam plug. Known high expansion foam generators comprise a wind tunnel a foam generating mesh at one end of the wind tunnel, a gas pressure generator for blowing air through the mesh and a spray located between the gas pressure generator and the mesh for spraying a foam generating liquid on to the mesh, the arrangement being such that the air blowing through the mesh will cause bubbles to be formed thereby producing a substantial amount of foam.

According to the present invention there is provided a foam generator comprising a wind tunnel, a foam generating mesh at one end of the wind tunnel, a gas pressure generator within the wind tunnel for blowing air through the mesh, and means within the mesh for dispersing a foam generating liquid throughout the mesh. Such means preferably comprise at least one pipe having a plurality of output apertures for the foaming composition. The pipe or pipes may be arranged horizontally or vertically as desired. In this context it should be mentioned that the mesh will normally lie in a vertical or substantially vertical plane, and the terms "horizontal" and "vertical," which are used descriptively rather than definitively relate to the apparatus in its normal position.

The mesh preferably comprises nylon wool, or foam material such as rubber or plastics foam. Alternatively the mesh may comprise natural or synthetic fibres or strands or metal or plastics wire knitted, interlaced or otherwise manufactured to allow the foam to percolate down the mesh. The mesh may be any combination of the above constituents. The mesh may be of non-uniform construction and have the number of apertures per unit area varying through its thickness and over its cross-section.

The thickness of the mesh provides a control of the number of apertures and a controlled size of air path through the mesh. By selecting the material a combination of materials and the number of layers or thickness, the desired output and foam characteristics may be chosen.

An embodiment of the invention will now be described by way of example with reference to the accompanying

2 diagrammatic drawing which shows a section through a foam generating unit of the invention.

Referring now to the drawings there is shown a foam generating unit of the invention comprising a fabricated metal wind tunnel 10. At one end of the wind tunnel 10, there is a foam generating mesh 11 and at the other end there is an air impeller in the form of a fan 12 driven by a motor (not shown) located within or outside the wind tunnel as desired. An appropriately shaped inlet 14 is provided for improved air flow under the influence of the fan 12. Instead of a fan, the air impeller could be comprised by a nozzle, preferably with an air entraining venturi tube, for blowing air from e.g. a compressed air source through the wind tunnel.

The mesh 11 comprises a layer of nylon wool. It is relatively thick and contain near its upper edge two water pipes 15 extending horizontally thereacross one behind the other. These water pipes 15 are connected to a source (not shown) of a mixture of foam generating material and water. A number of small openings are provided in the water pipes so that the liquid contents of the pipes 15 can escape evenly therefrom down the mesh. This liquid bridges the apertures in the mesh and forming a film thereover. When the fan 12 blows air through the wind tunnel 10, the current of air blows the bubbles thereby generating a foam.

The amount of foam produced and its characteristics may be adjusted by varying the air output or pressure produced by the fan, and/or the rate of supply of the foaming solution, and/or the concentration of the foam generating material in the liquid mixture.

I have found that the arrangement herein described enables the amount of liquid mixture to be efficiently used leaving a minimum amount of run off.

The apparatus may be of any convenient size and may, if necessary, be provided with a stand having skids, wheels or the like.

I claim:

1. A high expansion fire fighting foam generator comprising a wind tunnel, a relatively thick fibrous foam generating mass of non-uniform construction at one end of said wind tunnel, a gas pressure generator at the other end of said wind tunnel for blowing a stream of air through substantially the entire cross-sectional area of said mass, and horizontal pipe means embedded in said mass extending across substantially the entire upper end of said mass and having spaced outlets therein along the length thereof for percolating a foam generating liquid downwardly through substantially the entire width of said mass.

References Cited

UNITED STATES PATENTS

| | | | |
|---|---|---|---|
| 3,065,797 | 11/1962 | Barnes | 169—15 |
| 2,310,379 | 2/1943 | Wahl | 252—359.5 |
| 2,326,568 | 8/1943 | Rose | 239—343 X |
| 2,511,420 | 6/1950 | Thompson | 239—343 |
| 2,796,297 | 6/1957 | Klock | 239—343 X |
| 3,186,490 | 6/1965 | Jamison et al. | 169—14 X |

M. HENSON WOOD, Jr., Primary Examiner
MICHAEL Y. MAR, Assistant Examiner